(12) United States Patent
Wu

(10) Patent No.: US 9,235,755 B2
(45) Date of Patent: Jan. 12, 2016

(54) REMOVAL OF UNDERLINES AND TABLE LINES IN DOCUMENT IMAGES WHILE PRESERVING INTERSECTING CHARACTER STROKES

(71) Applicant: KONICA MINOLTA LABORATORY U.S.A., INC., San Mateo, CA (US)

(72) Inventor: Chaohong Wu, Mountain View, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 344 days.

(21) Appl. No.: 13/968,251

(22) Filed: Aug. 15, 2013

(65) Prior Publication Data

US 2015/0052426 A1    Feb. 19, 2015

(51) Int. Cl.
*G06K 9/34* (2006.01)
*G06K 9/00* (2006.01)
*G06F 17/24* (2006.01)

(52) U.S. Cl.
CPC .......... *G06K 9/00449* (2013.01); *G06F 17/245* (2013.01); *G06K 9/346* (2013.01)

(58) Field of Classification Search
None
See application file for complete search history.

(56) References Cited

U.S. PATENT DOCUMENTS

| | | | | |
|---|---|---|---|---|
| 5,065,437 A * | 11/1991 | Bloomberg | ........ | H04N 1/40062 358/462 |
| 5,583,956 A * | 12/1996 | Aghajan | .............. | G06K 9/3283 382/290 |
| 5,809,167 A * | 9/1998 | Al-Hussein | ........ | G06K 9/00463 382/176 |
| 6,282,326 B1 * | 8/2001 | Lee | ....................... | H04N 1/4097 382/275 |
| 8,009,928 B1 * | 8/2011 | Manmatha | ............. | G06K 9/325 382/173 |
| 8,218,875 B2 * | 7/2012 | Al-Omari | .......... | G06K 9/00463 358/474 |
| 8,649,600 B2 * | 2/2014 | Saund | ................ | G06K 9/00449 382/175 |
| 2006/0285763 A1 * | 12/2006 | Ashikaga | ................ | G06K 9/346 382/254 |
| 2011/0305387 A1 * | 12/2011 | Al-Omari | .......... | G06K 9/00463 382/165 |
| 2014/0029832 A1 * | 1/2014 | Molnar | ................. | G06T 7/0081 382/132 |
| 2014/0029853 A1 * | 1/2014 | Xue | ......................... | G06K 9/18 382/182 |

OTHER PUBLICATIONS

Kumar et al, Line Removal and Restoration of Handwritten Strokes, International Conference on Computational Intelligence and Multimedia Applications 2007.*

(Continued)

*Primary Examiner* — Andrae S Allison
(74) *Attorney, Agent, or Firm* — Chen Yoshimura LLP

(57) ABSTRACT

A method for removing horizontal and vertical lines in a document image while preserving integrity of the character strokes that intersect the lines. For each detected horizontal line, a vertical run length profile is calculated. Areas of the run length profile having two adjacent peaks with a valley in between are detected, which correspond to intersections of the horizontal line with non-vertical lines. A first derivative curve may be used to detect such peaks and valleys. Areas of the run length profile with large run length value for consecutive pixel locations are also detected, which corresponds to intersections of the horizontal line with near vertical lines. The horizontal line is removed in areas outside of the intersection areas, while preserving pixels within the intersection areas. Vertical line removal may be done similarly. This template-free method can remove lines in tables, forms, and underline and extract handwriting or printed characters.

14 Claims, 5 Drawing Sheets

(56) References Cited

OTHER PUBLICATIONS

Zhoa et al, Text detection in images using sparse representation with discriminative dictionaries, Image and Vision Computing 28 (2010) 1590-1599.*

Imtiaz, S.; Nagabhushan, P.; Gowda, S.D., "Rule Line Detection and Removal in Handwritten Text Images," in Signal and Image Processing (ICSIP), 2014 Fifth International Conference on, vol., no., pp. 310-315, Jan. 8-10, 2014.*

Cao et al, A Stroke Regeneration Method for Cleaning Rule-lines in Handwritten Document Images, MOCR '09, Jul. 25, 2009 Barcelona, Spain.*

Jayadevan et al., "Automatic processing of handwritten bank check images: a survey", International Journal on Document Analysis and Recognition (IJDAR), Dec. 2012, vol. 15, Issue 4, pp. 267-296, Springer-Verlag. Also published online Jul. 16, 2011.

Ye et al., "Extraction of bankcheck items by mathematical morphology", International Journal on Document Analysis and Recognition (IJDAR), Dec. 1999, vol. 2, Issue 2-3, pp. 53-66, Springer-Verlag.

Yu et al., "A Generic System for Form Dropout", IEEE Transactions on Pattern Analysis and Machine Intelligence, Nov. 1996, vol. 18, Issue 11, pp. 1127-1134.

* cited by examiner

REMOVAL OF UNDERLINES AND TABLE LINES IN DOCUMENT IMAGES WHILE PRESERVING INTERSECTING CHARACTER STROKES

BACKGROUND OF THE INVENTION

1. Field of the Invention

This invention relates to processing of document images, and in particular, it relates to a process for removal of horizontal, vertical, or other straight lines from the document image while preserving the continuity of character strokes that intersect such lines.

2. Description of Related Art

In digital processing of document images, i.e., digital images that represent documents, it is often desirable to remove horizontal and vertical lines within the image. Examples of such straight lines include underlines in text, and horizontal and vertical lines of tables and forms. For example, when applying OCR (optical character recognition) to a document image to extract text of the document, if is often desirable to remove underlines first because they interfere with character recognition. In another example, digital processing of images of bank checks often requires removal of various lines. The document image is typically obtained by scanning or photographing a hard copy document; line detection and removal can be performed before or after binarization which is a process that converts a gray-scale document image into a binary document image.

Various line detection and removal method have been proposed. Detecting line segments can be performed on binary images. This category of methods include run length coding, least square fitting, Hough transform, and mathematical morphology with a flat linear structuring element that is symmetric with respect to the neighborhood center. Least square fitting method can be affected significantly by noises. Run length coding is based on searching or tracing of local line-like structures as candidates of line segments. The block-adjacency graph (BAG) is a generalization of the line-adjacency graph where adjacency horizontal runs are merged. See, for example, Bin Yu and Anil K. Jain, "A Generic System for Form Dropout", IEEE Trans. PAMI, Vol. 18, No. 11, 1996 (hereinafter "Yu et al. 1996"). However, Run length code and its extension BAG methods often do not deliver satisfactory result where the lines to be removed are in disconnected pieces. In BAG-based system, both handwriting and machine printed characters can be extracted only if the blank form document is offered to generate form-structure template. Hough transform is extremely time-consuming, since it converts every pixel in the image into Hough parameter space through expensive trigonometric computation.

Detecting line segments can also be performed on gray-level document images. Typical methods include vectorization-based tracing, mathematical morphology, and line segment detector (LSD). LSD-based method does not work well for document images because LSD is based on gradient-fitting. Complicate text field gradient map can change local line gradient distribution.

Many existing line removal methods do not preserve the complete strokes of handwriting and printed characters that intersect the lines; as a result, individual symbols sometimes become disintegrated into several broken parts, or parts of the symbols are sometimes truncated, in the binarized image after line removal. FIG. 7 illustrates some examples of underline removal using a conventional method, where the result of broken characters and truncation can be seen. Some methods attempt to re-connect broken characters after line removal. For example, Yu et al. 1996 describes an approach to line removal which includes localization of lines, separation of characters and lines, and reconstruction of broken strokes introduced during separation.

Xiangyun Ye, Mohamed Cheriet, Ching Y. Suen, and Ke Liu, "Extraction of bankcheck items by mathematical morphology," International J. on Document Analysis and Recognition (1999) (hereinafter "Ye et al. 1999") describes a method of extracting characters from bank check images, which uses mathematical morphology for line detection. Broken strokes after line removal are then restored using dynamic kernels. In Ye's stroke restoration method, correct local orientation around the region of line and stroke intersection is needed to find the right dynamic kernels for mending broken stroke, but local orientation is dependent on the length and width of touching line and stroke.

SUMMARY

The present invention is directed to a method and related apparatus for line removal in document images that substantially obviate one or more of the problems due to limitations and disadvantages of the related art.

An object of the present invention is to provide a method for removing straight lines from document images while preserving characters strokes that intersect the lines.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for processing a document image containing straight lines extending in a first direction, the method including: (a) identifying a straight line extending in the first direction; (b) calculating a run length profile for the line, the run length profile being a run length value as a function of a position in the first direction along the line, wherein each run length value at a given position is a number of consecutive non-white pixels extending in a second direction perpendicular to the first direction including non-white pixels within the line; (c) detecting a set of first type of intersection areas of the line by detecting a first type of characteristic features of the run length profile, each of the first type of characteristic feature including a valley and two peaks located on both sides of the valley within a predefined distance, a difference between run length values of each of the peaks and the valley being greater than a first threshold value; (d) detecting a set of second type of intersection areas of the line by detecting a second type of characteristic features of the run length profile, each of the second type of characteristic feature including a number of consecutive positions where the run length values are greater than a second threshold value; and (e) removing the line in areas outside of the first and second types of intersection areas while preserving the lines in the first and second types of intersection areas.

In one embodiment, step (c) includes calculating a first derivative curve of the run length profile; detecting upward zero crossing points and downward zero crossing points of the first derivative curve; and identifying the first type of intersection areas by matching the upward zero crossing points and the downward zero crossing points. In one embodiment, the first derivative curve is calculated using N-point center difference.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above methods.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provides methods in document image processing for detecting and removing straight lines while preserving characters strokes that intersect the lines. Characters in the document can include printed or handwritten characters. Examples of straight lines include underlines for text, lines in tables and forms, etc. Such lines tend to be very close to vertical or horizontal and are referred to as vertical and horizontal lines in this disclosure, but it should be understood that they may not be strictly horizontal or vertical due to skew or other distortions in the imaging process. In other words, it should be understood that the terms "a horizontal line," "a vertical line," "a line extending in the horizontal direction," and "a line extending in the vertical direction" as used in this disclosure and appended claims broadly include near-horizontal and near-vertical lines, for example, lines that may deviate by up to 1 degree from the horizontal and vertical directions, respectively. It should be noted that original images as obtained from an imaging process (e.g. scanning or photographing) often include skew and other distortion. De-skewing, a widely used technique in document image processing, should be applied to the image as a pre-processing step, to correct skew introduced in the imaging process. Currently available de-skewing techniques can correct the skew to far below 1 degree.

The descriptions below focus on removal of horizontal and vertical lines; however, as discussed later, the method can also be used to remove non-vertical and non-horizontal lines by rotating the image first.

Figure 1:
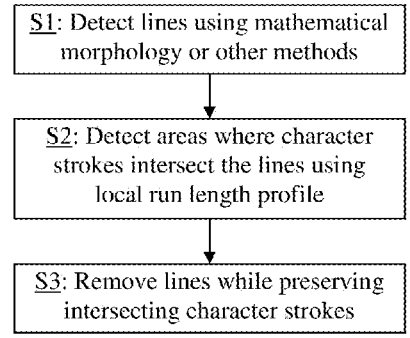
FIG. 1 schematically illustrates the stages of a method for detecting and removing straight lines from a document image according to an embodiment of the present invention.

FIG. 1 schematically illustrates a method for detecting and removing straight horizontal or vertical lines from a document image according to an embodiment of the present invention. This method is applied to a document image that has been binarized. The method includes three stages. First, the presence of lines is detected by using, for example, mathematical morphology (step S1). Known methods may be used for this stage. Second, intersecting areas between character strokes and lines are detected using a method that employs local run length profile (step S2). Third, based on the detection result from step S2, the lines are removed using a method that preserves the intersecting character strokes (step S3).

Prior to applying steps S1 to S3 shown in FIG. 1, the document image may undergo certain pre-processing steps, many of which are generally known in the art.

These stages are described in more detail below, using the examples shown in FIGS. 2(a)-4(b). The description below uses a horizontal line as an example, but the method can be applied to vertical lines with appropriate modifications, e.g., by switching the x and y pixel coordinates in the method.

Figure 2A:
FIG. 2(a) illustrates an example of a gray-scale document image containing horizontal straight lines that intersect with strokes of handwritten characters.
Figure 2B:
FIG. 2(b) illustrates a binary image obtained from the image of FIG. 2(a) after horizontal lines removal using a method according to embodiments of the present invention.
Figure 3A:
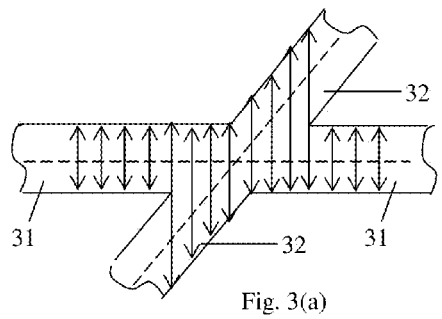
FIG. 3(a) is an enlarged schematic illustration of a patch of a document image showing an intersection of a horizontal line segment and a part of a character stroke.

FIG. 2(a) shows an example of a part of an original gray-scale document image, showing three horizontal straight lines with a number of areas where each line is intersected by strokes of some handwritten characters. FIG. 2(b) shows the image of FIG. 2(a) after binarization and after the horizontal lines are removed using the method of FIG. 1. FIG. 3(a) is a schematic illustration of an enlarged patch of a document image showing an intersection of a horizontal line segment 31 and a part of a character stroke/line 32. The dashed lines in FIG. 3(a) represent the approximate center of the two lines. Note that for simplicity, the character stroke 32 is shown as a straight line, but it can be a curved line as well.

For the first stage S1, line detection, mathematical morphology may be employed. Basic mathematical morphological operations include erosion, dilation, opening, and closing. To detect horizontal lines, a horizontal opening operation with a fixed length of flat linear structuring element (for example about the size of line structure selects 150 pixels) may be applied to the image. Other line detection methods may be used as well, such as Hough transform, run length coding, multi-scale line detection, etc. Some of these methods can detect lines that extend in any direction, not just near-horizontal and near-vertical lines. Many of these methods are well-known. The line detection step extracts the lines from the document image and generates an intermediate image containing only the extracted lines. The intermediate image does not contain the other lines that intersect the extracted lines.

Figure 4A:
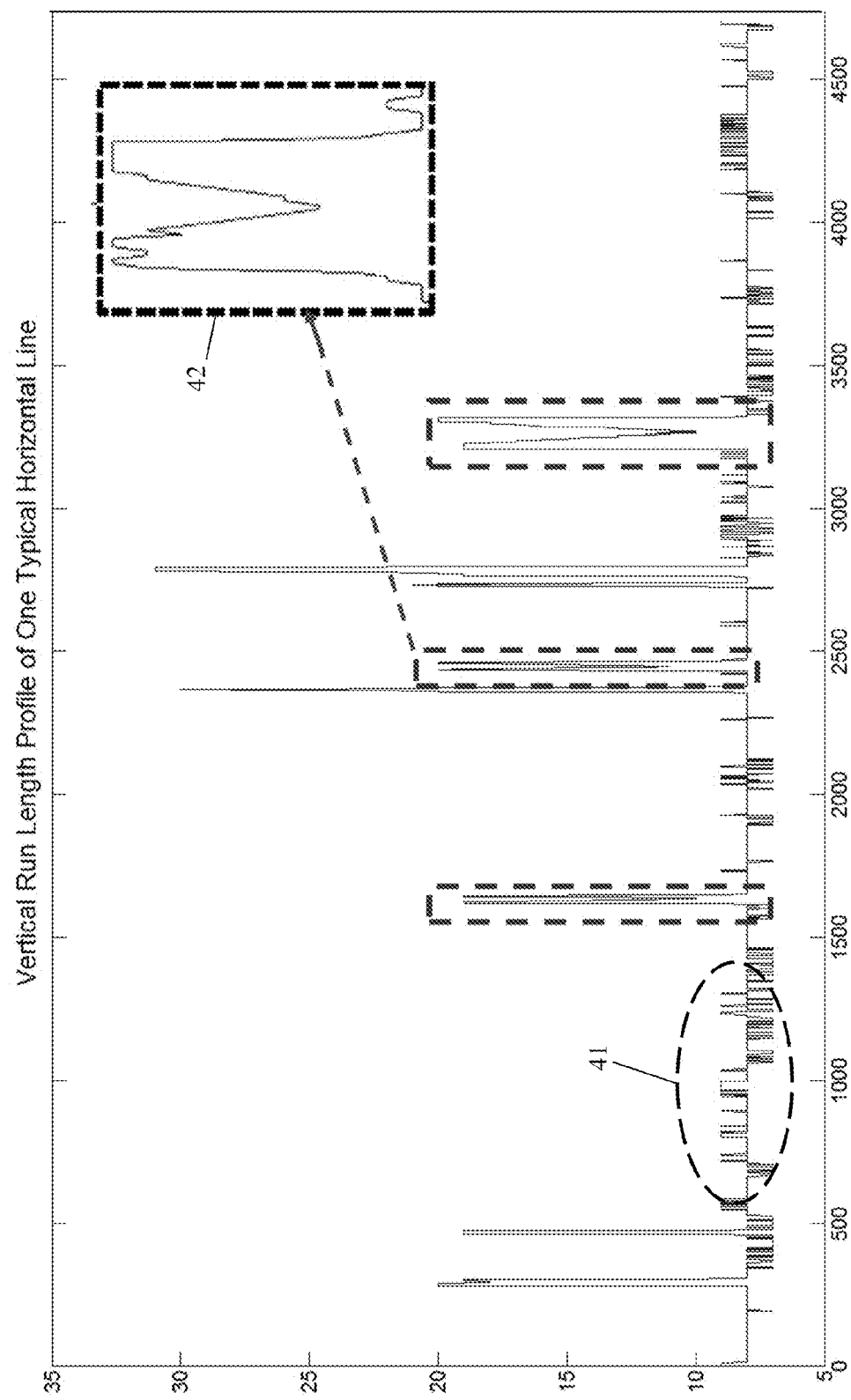
FIG. 4(a) illustrates a vertical run length profile for a horizontal line.

The detection of intersection of lines and strokes (second stage S2) is described with reference to FIGS. 3(a), 4(a) and 4(b). The intersection detection method uses a vertical run length profile of the detected horizontal line. A vertical run length is the number of consecutive non-white pixels running in the vertical (y) direction. The vertical run length profile of a horizontal line as defined here is the vertical run length value as a function of the horizontal coordinate x along the line; the run of non-white pixels in the vertical direction includes non-white pixels that make up the line and any non-white pixels connected consecutively (in the y direction) with them. At x positions along the line that are not involved in an intersection, the vertical run lengths tends to be a constant which is the height of the line (the width of a horizontal line is commonly referred to as the line height). FIG. 4(a) shows a vertical run length profile for a horizontal line; in this example, it is the run length profile of the horizontal line in FIG. 2(a) located above the signature. It can be seen that, for example, segment 41 corresponds to a segment of the line that does not involve any intersections; the line with for this line segment is about 8 pixels, with the vertical run length values fluctuating between 7 and 9 pixels. It should be noted that the x and y coordinate values of pixels are integer numbers.

At x positions in the vicinity of an intersection with another line (e.g. a character stroke), as schematically depicted in FIG. 3(a), the vertical run length values deviate from the constant value (the line height) significantly. In FIG. 3(a), a number of short, double-arrowed vertical lines are drawn to schematically indicate the run lengths at various x positions. A typical behavior of the run length profile is as follows. Starting from an x position outside of the intersection area, as x increases, the run length value stays near the constant value (the line height); as x reaches the beginning of the intersection area, the run length value increases sharply; it then drops relatively gradually to a minimum value when x is near the center of the intersection area, before increasing relatively gradually; when x reaches the end of the intersection area, the run length value drops sharply back to near the constant value. In other words, the run length profile along the x axis has two peaks and a valley in between, where the outside slopes of the peaks (those facing away from the valley) are steep and the inside slopes (those facing the valley) are relatively less steep. In FIG. 4(a), the insert box labeled 42 is an expanded view of a portion of the run length profile that shows this behavior.

Figure 5:
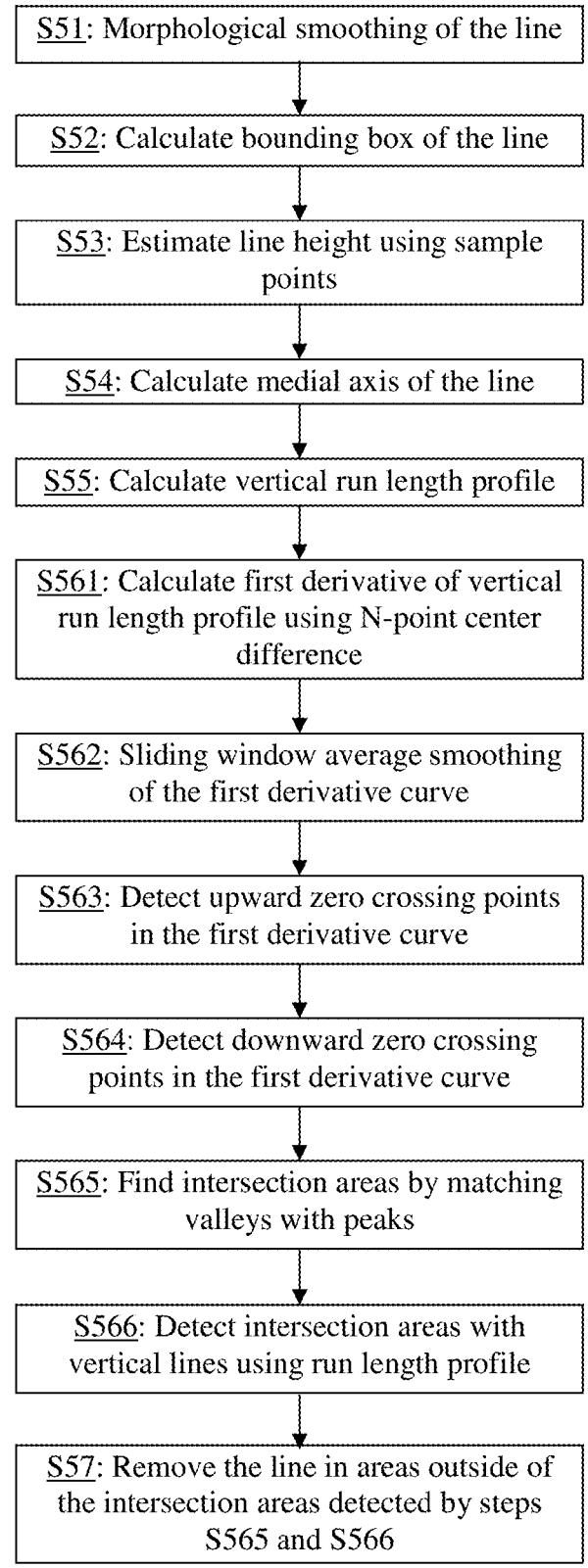
FIG. 5 schematically illustrates a method of detecting line intersection areas according to an embodiment of the present invention.

As this behavior of the run length profile is characteristic in areas of line intersections, it can be used to detect intersections. FIG. 5 schematically illustrates a method for detecting intersections along a line and for removing the line in a stroke-preserving manner according to an embodiment of the present invention. This method corresponds to stages S2 and S3 of FIG. 1. The steps shown in FIG. 5 are applied to each line detected in stage S1.

Using the intermediate image which contain only the detected lines, morphological smoothing is first applied to the line being processed to smooth it (step S51). This step is desired but optional. Then, the bounding box of the line is calculated (step S52). The bounding box of an image object is a box, typically rectangular in shape, that bounds the image object. Because the intermediate image contains only the detected lines and not the other intersecting lines, the bounding box will substantially conform to the shape of the line if the line is strictly horizontal. If the line is not strictly horizontal, the bounding box will be taller than the line height. Then, a number of sample points (i.e. x positions) are used to estimate the line height (step S53). Preferably, the number of sample points is pre-determined, and the points are at equally-spaced locations along the line. The line height at each sample point x may be calculated by counting the number of non-white pixels within the bounding box at that x position. In one example, 30 sample points are used.

Then, the medial axis of the line is calculated (step S54). Generally speaking, the medial axis of an object is the set of all points having more than one closest point on the object's boundary. It should be noted that the true medial axis of the line object may not pass through pixel centers, particularly when the line is not strictly horizontal. Here the medial axis of the line may be defined by pixels that are located the closest to the true medial axis. Thus, if the line is slightly slanted, then the medial axis may have a stepped shape. The medial axis may be obtained by tracing the line. Again, since the intermediate image contains only horizontal lines without branches, tracing is straightforward. Even in cases where two lines are parallel and very close to each other, the medial axis tracing will not cross the boundary of lines.

Then, the vertical run length profile for the line, i.e. the vertical run length values at each point (x position) along the medial axis, is calculated (step S55). This may be done, for example, by starting from the pixel on the medial axis and counting the number of consecutively connected non-white pixels in the vertical up and down directions. Preferably, when calculating the vertical run length, an upper limit and a lower limit of the y coordinate above and below the medial axis are imposed in order to avoid excessively long run lengths in the case when the horizontal line intersects a vertical line or character stroke.

Then, using the run length profile (e.g. FIG. 4(a)), the intersection areas are detected in steps S561-S565. First, a first derivative of the run length profile is calculated using N-point center difference (step S561). N-point center difference is defined as:

$$d(i)=S(i+N)-S(i-N)$$

where S is the signal (run length) value, d is the first derivative, i is the x position, and N is a predetermined number. The value of N may be, for example, from 1 to 10. Generally speaking, the closer the intersecting line is to vertical, the narrower the peaks and valley will be, and therefore relatively smaller values of N would be desirable.

A simpler equation to calculate a first derivative would be $$d(i)=S(i+1)-S(i)$$

Compared to this more typical definition, the N-point center difference used in the embodiment here helps to remove localized noise and to deal with flat peak tops in the vertical run length profile, as that shown in insert box 42 of FIG. 4(a) (the peak on the right). If the simpler equation were used, in the flat peak area the first derivative would be zero, leading to difficulties in detecting the zero-crossings which will be described in more detail later.

Other ways of calculating a first derivative may be used, but preferably the equation used should include some form of averaging to reduce or eliminate the effect of the flat tops.

The first derivative curve is preferably smoothed, for example, by using sliding window averaging (step S562). The window size may be, for example, 6 pixels.

Figure 4B:
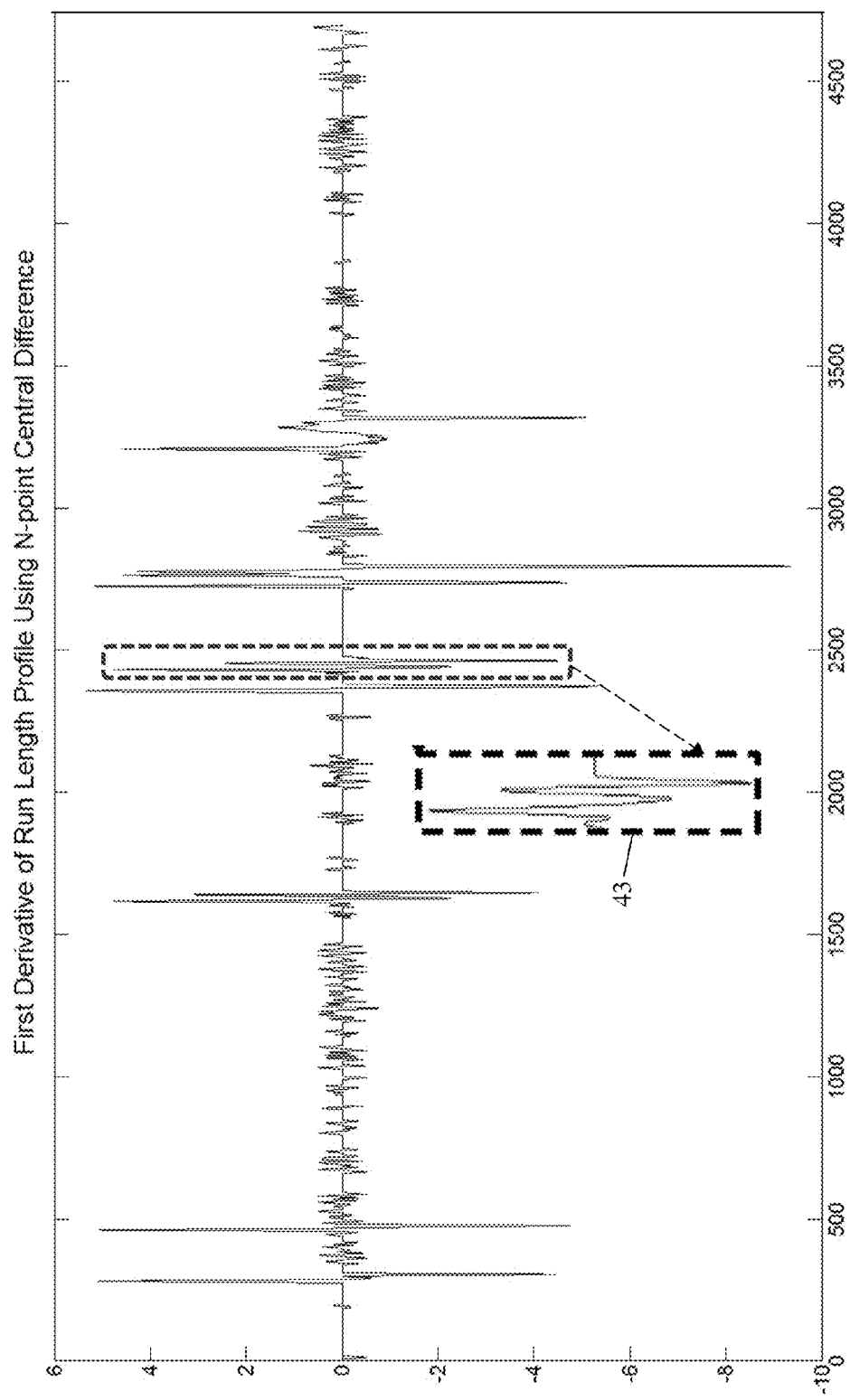
FIG. 4(b) illustrates a first derivative curve obtained from the run length profile of FIG. 4(a).

FIG. 4(b) shows a first derivative curve of the vertical run length profile shown in FIG. 4(a). In this particular example, the first derivative was calculated using N-point center difference with N=3. Insert box 43 shows an expanded view of a section of the first derivative curve in an intersection area. Because the vertical run length profile in an intersection area has the characteristic shape of two peaks with a valley in between, the first derivative curve in this area has the following characteristic shape: Starting from a near-zero level, it rises sharply to a positive value, then drops sharply to a negative value while passing a first zero crossing point, then rises sharply for a second time to a positive value while passing a second zero crossing point, then drops sharply for a second time to a negative value while passing a third zero crossing point, and finally rises back to the near-zero level. The first and third zero-crossing points (downward zero crossing) correspond to the top of the peaks in the run length profile; the second zero-crossing point (upward zero crossing) corresponds to the bottom of the valley.

This characteristic shape of the first derivative curve is used to detect valleys (step S563) and peaks (step S564) of the run length profile. Specifically, upward zero crossings in the first derivative curve (corresponding to valleys) may be detected by finding x positions j that satisfy:

$$d(j) \leq 0 \text{ and } d(j+1) > 0, \text{ and}$$

$$d(j+1) - d(j) > T1$$

In other words, the first derivative value changes from negative (or zero) to positive near point j and the slope of the first derivative curve at that point is greater than a threshold T1. The purpose of the threshold T1 is to eliminate points in the non-intersection areas where the first derivative value fluctuates around zero by small amounts.

Downward zero crossing in the first derivative curve (corresponding to peaks) may be detected by finding x positions k that satisfy:

$$d(k) \geq 0 \text{ and } d(k+1) < 0, \text{ and}$$

$$d(k) - d(k+1) > T2$$

where T2 is a threshold value.

The locations j and k found this way correspond to the peak and valley locations in the vertical run length profile.

After all valleys and peaks locations are found, the presence of intersection areas is validated by matching the valley locations and the peak locations (step S565). Specifically, for each valley location (upward zero crossing point), if two peak locations (downward zero crossing points) exist within a certain distance to the left and right, respectively, of the valley, and if the difference in run length values between the peak location and the valley location is greater than a threshold for both the left and right peaks, then the valley and two corresponding peaks are deemed to define an intersection area. The intersection area may be defined as starting and ending at the left and right peak locations, respectively, or it may be defined to also include a predetermined number of pixels to the left and right of the peaks, respectively.

As mentioned earlier, generally speaking, a relatively small value of N for the N-point center difference tends to work better for detecting intersections with lines that are closer to vertical, and a relatively large value of N tends to work better for detecting intersections with lines that are closer to horizontal. For typical documents, a carefully chosen N value (e.g., 5) will produce satisfactory results. To enhance line detection reliability and stability, in one implementation, steps S561 to S565 are performed multiple times with different N values, for example, twice with N=3 and N=6 respectively, and the intersection areas detected in step S565 from the multiple runs are combined together (i.e. by a union of the multiple sets of detected intersections).

The above-described characteristic behavior of the vertical run length profile and its first derivative curve occurs in a type of intersection areas where the horizontal line intersects a non-vertical line. In a second type of intersection areas, where the horizontal line intersects a vertical or near vertical line, the vertical run length profile will not have a valley and two peaks; rather, it will have a number of consecutive x positions with large run length values, typically larger than three times the line height. As mentioned earlier, when calculating the vertical run length, upper and lower limits are imposed; thus, the run length values in an area of an intersecting vertical or near vertical line are often as high as the upper and/or lower limit would allow. These second type of intersection areas are detected by detecting such features in the run length profile (step S566).

Figure 3B:
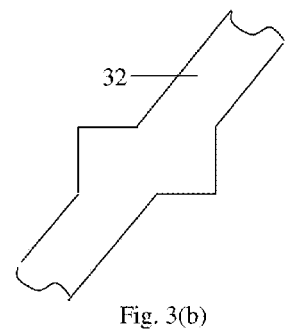
FIG. 3(b) schematically illustrates the patch of image of FIG. 3(a) after the line is removed while the intersecting stroke is preserved using the method according to embodiments of the present invention.

In step S57 (corresponding to stage S3 of FIG. 1), the detected lines are removed, for example, by changing the pixel values to white, for all pixels of the line that are located outside of the two types of intersection areas, i.e. intersection areas detected in steps S565 and S566. Pixel values for pixels located within these intersection areas will be preserved. FIG. 3(b) schematically illustrates the result of line removal applied to the line segment shown in FIG. 3(a).

The line detection and removal method described here does not require a priori knowledge or assumptions regarding the locations of the lines. In other words, the method is a template-free system of removing lines in tables, forms, and underline and extracting handwriting or printed characters.

The method described above can be modified for vertical line removal. For example, instead of vertical run length profile, a horizontal run length profile for the vertical line is used.

Also, the method is not limited to removal of horizontal and vertical lines; it can be used to remove slanted lines as well. To accomplish this, in the line detection stage (S1), a method that can detect lines in any directions, such as a Hough transform method, is used. After the direction of the detected line is calculated, the image or the portion of the image including the slanted line is rotated so that the slanted line becomes a horizontal (or vertical) line. Then, the intersection detection stage and line removal stage ((steps S2 and S3 in FIG. 1, steps S51-S57 in FIG. 5) can be performed on the rotated image. After line removal, the image is rotated back to its original orientation.

Figure 6:
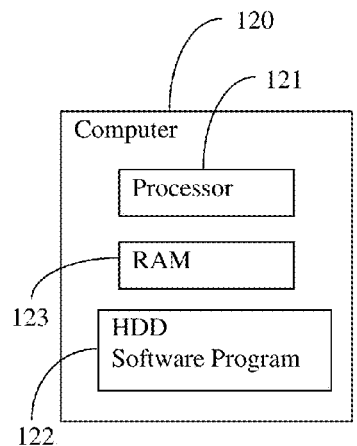
FIG. 6 schematically illustrates a data processing apparatus in which embodiments of the present invention may be implemented.
Figure 7:
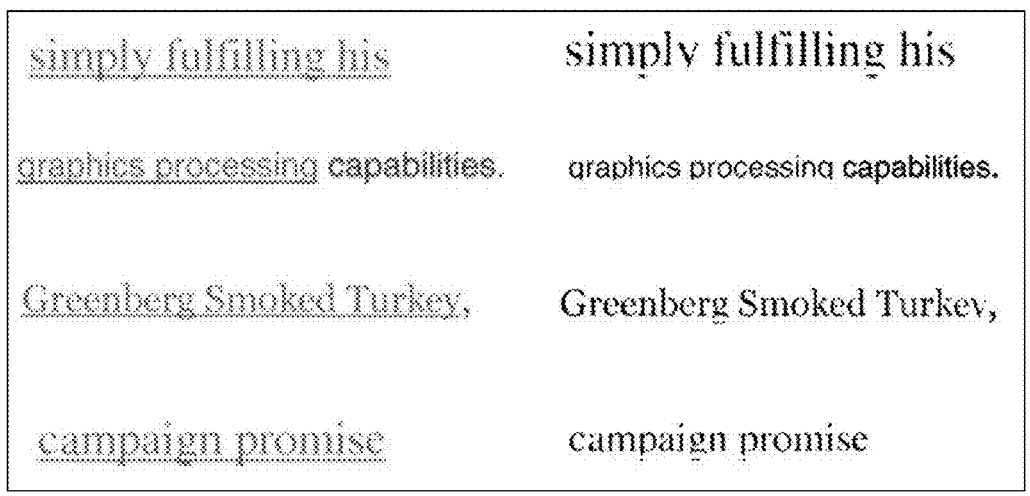
FIG. 7 shows examples of line removal using conventional methods.

The line removal methods described here can be implemented in a data processing system such as a computer 120 shown in FIG. 6. The computer 120 comprises a processor 121, a storage device (e.g. hard disk drive) 122, and an internal memory (e.g. a RAM) 123. The storage device 122 stores software programs, which are read out to the RAM 123 and executed by the processor 121 to carry out the methods.

It will be apparent to those skilled in the art that various modification and variations can be made in the line removal method of the present invention without departing from the spirit or scope of the invention. Thus, it is intended that the present invention cover modifications and variations that come within the scope of the appended claims and their equivalents.

What is claimed is:

1. A method for processing a document image containing straight lines extending in a first direction, the method comprising:
   (a) identifying a straight line extending in the first direction;
   (b) calculating a run length profile for the line, the run length profile being a run length value as a function of a position in the first direction along the line, wherein each run length value at a given position is a number of consecutive non-white pixels extending in a second direction perpendicular to the first direction including non-white pixels within the line;
   (c) detecting a set of first type of intersection areas of the line by detecting a first type of characteristic features of the run length profile, each of the first type of characteristic feature including a valley and two peaks located on both sides of the valley within a predefined distance, a difference between run length values of each of the peaks and the valley being greater than a first threshold value;
   (d) detecting a set of second type of intersection areas of the line by detecting a second type of characteristic features of the run length profile, each of the second type of characteristic feature including a number of consecutive positions where the run length values are greater than a second threshold value; and (e) removing the line in areas outside of the first and second types of intersection areas while preserving the lines in the first and second types of intersection areas.

2. The method of claim 1, wherein step (b) includes:
calculating a medial axis of the line; and
calculating the run length values at each pixel position of the medial axis by counting the number of consecutive non-white pixels connected with a pixel on the medial axis and extending in the second direction.

3. The method of claim 1, wherein step (c) includes:
calculating a first derivative curve of the run length profile;
detecting upward zero crossing points and downward zero crossing points of the first derivative curve; and
identifying the first type of intersection areas by matching the upward zero crossing points and the downward zero crossing points.

4. The method of claim 1, wherein step (c) includes:
(c1) calculating a first derivative curve d(i) of the run length profile, where i is the position in the first direction;
(c2) detecting upward zero crossing points j in the first derivative curve which satisfy:

$d(j) \leq 0$ and $d(j+1) > 0$, and $d(j+1) - d(j) > T1$ where T1 is a third threshold value,
(c3) detecting downward zero crossing points k in the first derivative curve which satisfy:

$d(k) \geq 0$ and $d(k+1) < 0$, and $d(k) - d(k+1) > T2$ where T2 is a fourth threshold value,
(c4) identifying the set of first type of intersection areas each being where two downward zero-crossing points are located on both sides of an upward zero-crossing point within the predefined distance and where a difference in run length values between each of the downward zero-crossing points and the upward zero-crossing point is greater than the first threshold value, where the first type of intersection area is defined as an area between the two downward zero-crossing points.

5. The method of claim 4, wherein in step (c1), the first derivative curve is calculated using N-point center difference:

$d(i) = S(i+N) - S(i-N)$ where S is the run length value and N is a predetermined number.

6. The method of claim 5, wherein step (c) further comprises:
(c5) repeating step (c1) using a different N value to calculate another first derivative curve of the run length profile;
(c6) repeating steps (c2), (c3) and (c4) using the other first derivative curve to identify another set of first type of intersection areas; and
(c7) combining the set of first type of intersection areas identified in step (c4) and the other set of first type of intersection areas identified in step (c6).

7. The method of claim 5, further comprising, before step (c2), smoothing the first derivative curve calculated by N-point center difference.

8. A computer program product comprising a computer usable non-transitory medium having a computer readable program code embedded therein for controlling a data processing apparatus, the computer readable program code configured to cause the data processing apparatus to execute a process for processing a document image containing straight lines extending in a first direction, the process comprising:

(a) identifying a straight line extending in the first direction;
(b) calculating a run length profile for the line, the run length profile being a run length value as a function of a position in the first direction along the line, wherein each run length value at a given position is a number of consecutive non-white pixels extending in a second direction perpendicular to the first direction including non-white pixels within the line;
(c) detecting a set of first type of intersection areas of the line by detecting a first type of characteristic features of the run length profile, each of the first type of characteristic feature including a valley and two peaks located on both sides of the valley within a predefined distance, a difference between run length values of each of the peaks and the valley being greater than a first threshold value;
(d) detecting a set of second type of intersection areas of the line by detecting a second type of characteristic features of the run length profile, each of the second type of characteristic feature including a number of consecutive positions where the run length values are greater than a second threshold value; and
(e) removing the line in areas outside of the first and second types of intersection areas while preserving the lines in the first and second types of intersection areas.

9. The computer program product of claim 8, wherein step (b) includes:
calculating a medial axis of the line; and
calculating the run length values at each pixel position of the medial axis by counting the number of consecutive non-white pixels connected with a pixel on the medial axis and extending in the second direction.

10. The computer program product of claim 8, wherein step (c) includes:
calculating a first derivative curve of the run length profile;
detecting upward zero crossing points and downward zero crossing points of the first derivative curve; and
identifying the first type of intersection areas by matching the upward zero crossing points and the downward zero crossing points.

11. The computer program product of claim 8, wherein step (c) includes:
(c1) calculating a first derivative curve d(i) of the run length profile, where i is the position in the first direction;
(c2) detecting upward zero crossing points j in the first derivative curve which satisfy:

$d(j) \leq 0$ and $d(j+1) > 0$, and $d(j+1) - d(j) > T1$ where T1 is a third threshold value,
(c3) detecting downward zero crossing points k in the first derivative curve which satisfy:

$d(k) \geq 0$ and $d(k+1) < 0$, and $d(k) - d(k+1) > T2$ where T2 is a fourth threshold value,
(c4) identifying the set of first type of intersection areas each being where two downward zero-crossing points are located on both sides of an upward zero-crossing point within the predefined distance and where a difference in run length values between each of the downward zero-crossing points and the upward zero-crossing point is greater than the first threshold value, where the first type of intersection area is defined as an area between the two downward zero-crossing points.

12. The computer program product of claim 11, wherein in step (c1), the first derivative curve is calculated using N-point center difference:

$$d(i)=S(i+N)-S(i-N)$$

where S is the run length value and N is a predetermined number.

13. The computer program product of claim 12, wherein step (c) further comprises:
- (c5) repeating step (c1) using a different N value to calculate another first derivative curve of the run length profile;
- (c6) repeating steps (c2), (c3) and (c4) using the other first derivative curve to identify another set of first type of intersection areas; and
- (c7) combining the set of first type of intersection areas identified in step (c4) and the other set of first type of intersection areas identified in step (c6).

14. The computer program product of claim 12, further comprising, before step (c2), smoothing the first derivative curve calculated by N-point center difference.

* * * * *